No. 848,588. PATENTED MAR. 26, 1907.
C. W. DAKE.
ELASTIC FLUID TURBINE.
APPLICATION FILED NOV. 29, 1905. RENEWED SEPT. 8, 1906.

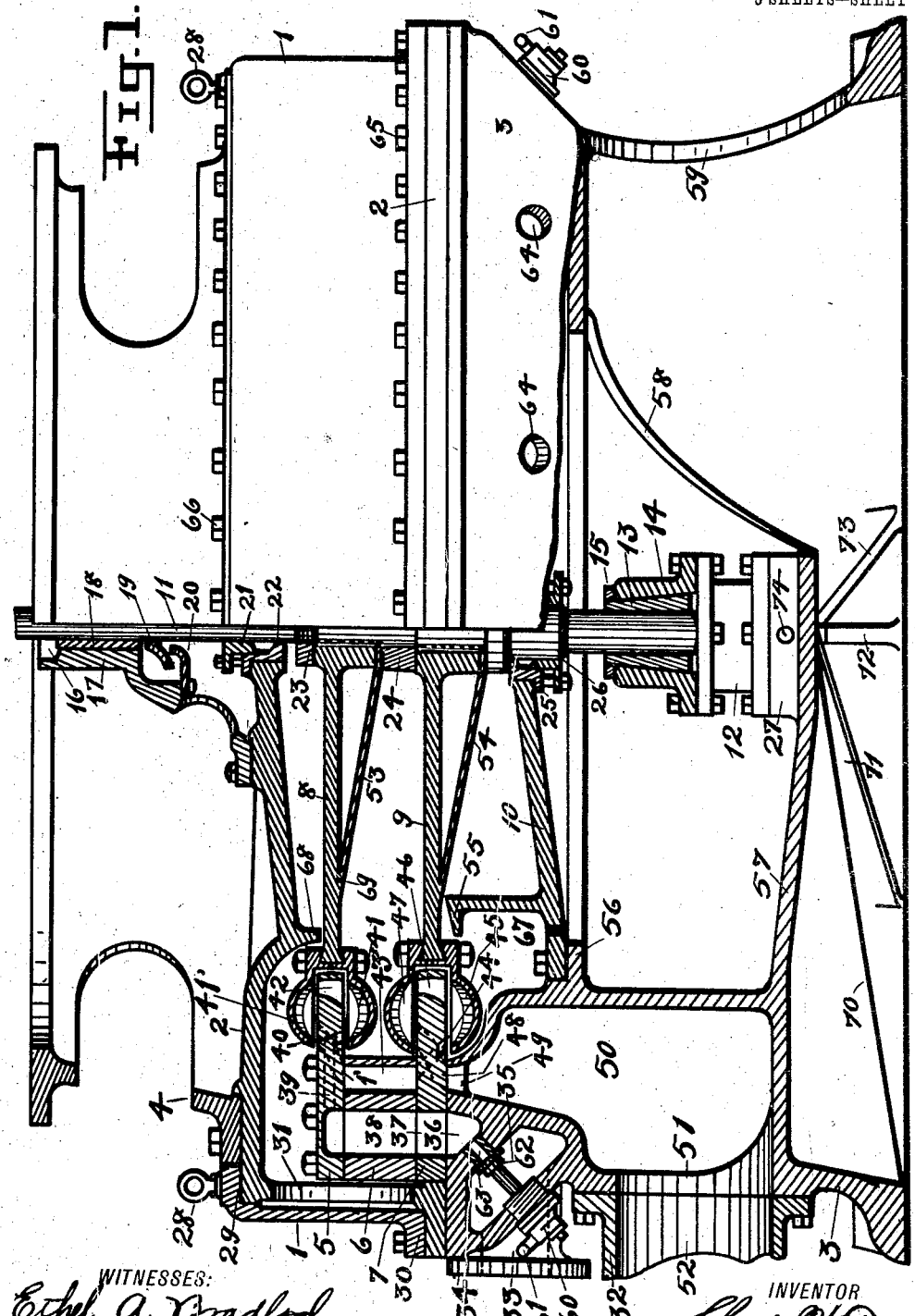

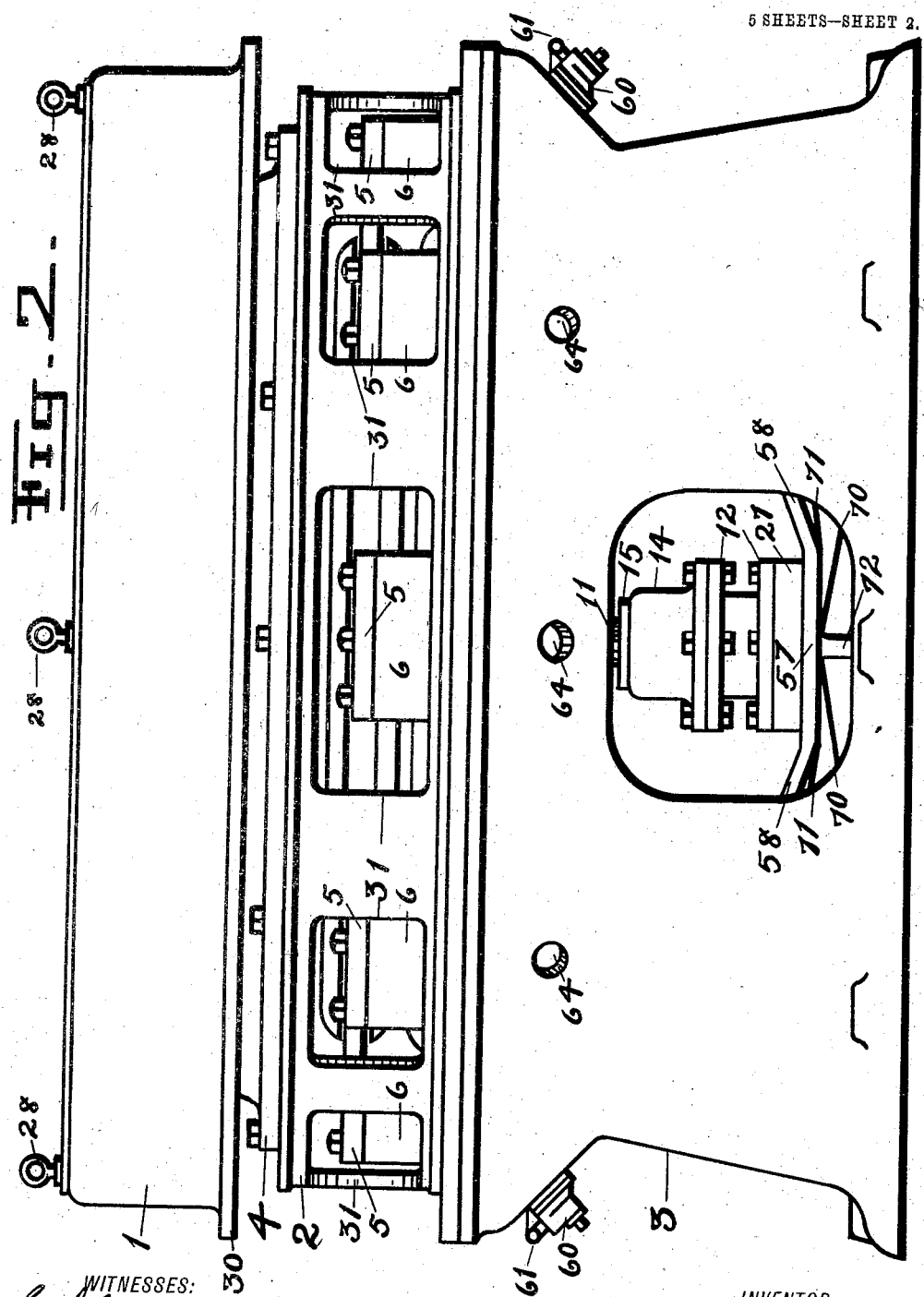

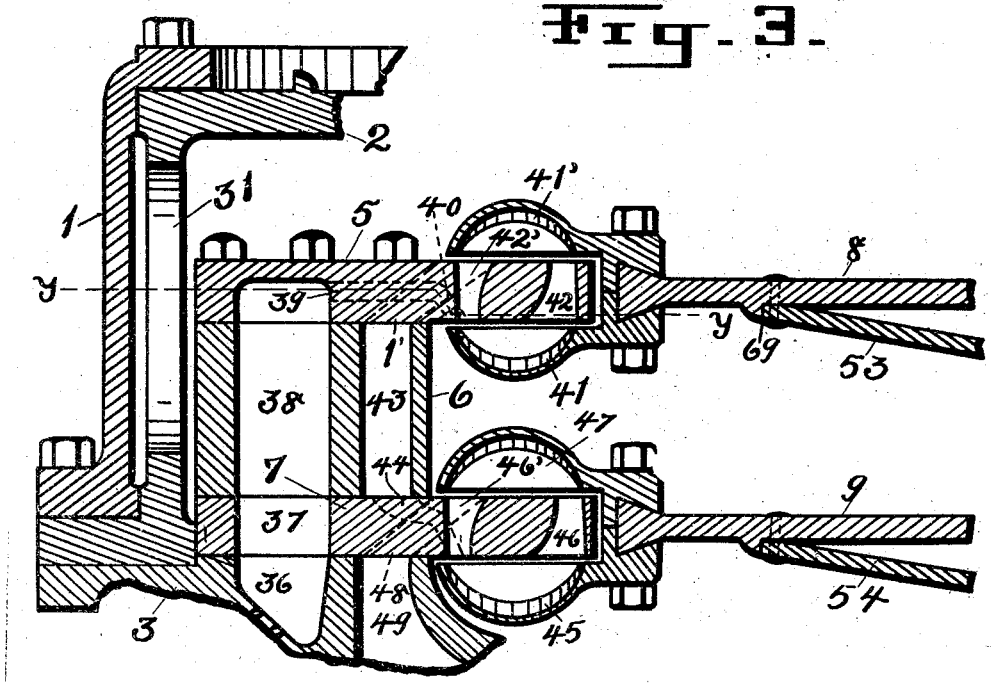

5 SHEETS—SHEET 4.

WITNESSES:
Ethel A. Bradford
Lulu G. Greenfield

INVENTOR
Charles W. Dake
BY
Chappell & Earl
ATTORNEYS

No. 848,588. PATENTED MAR. 26, 1907.
C. W. DAKE.
ELASTIC FLUID TURBINE.
APPLICATION FILED NOV. 29, 1905. RENEWED SEPT. 8, 1906.
5 SHEETS—SHEET 5.
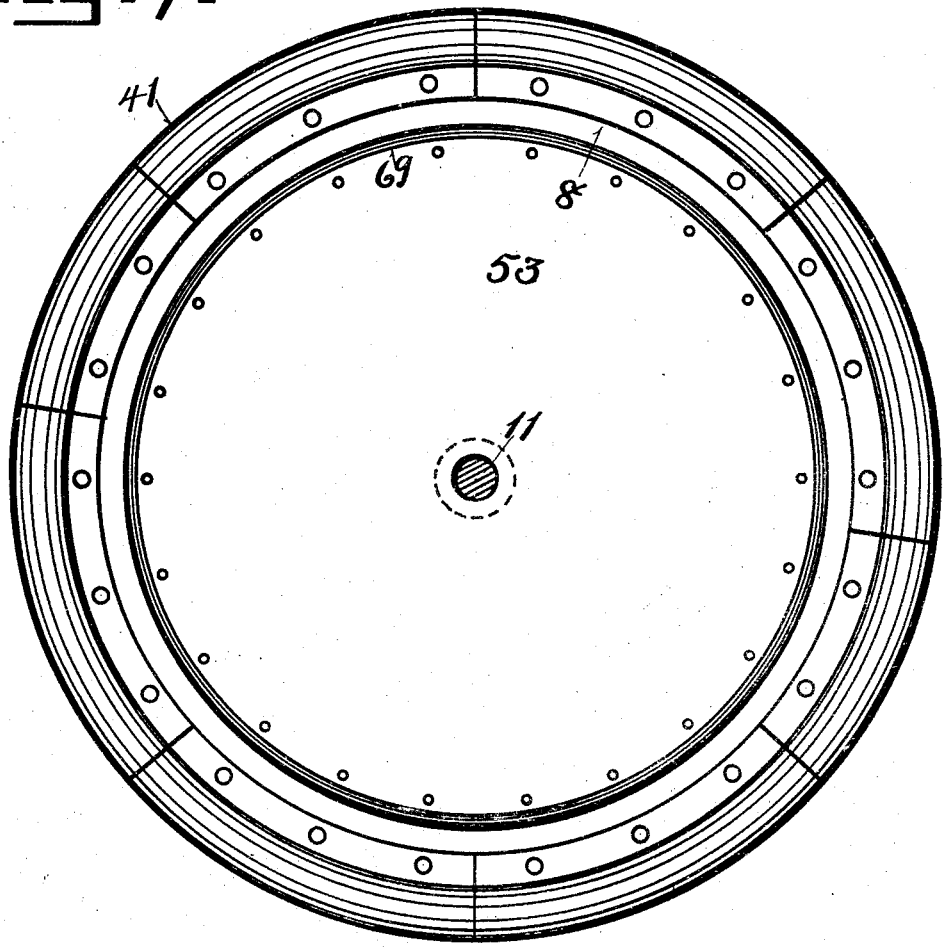
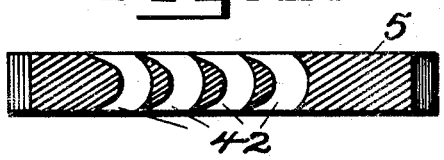
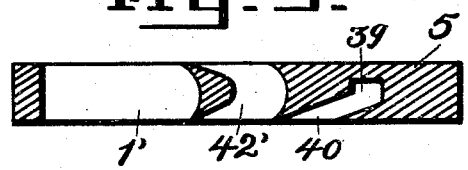

UNITED STATES PATENT OFFICE.

CHARLES W. DAKE, OF GRAND RAPIDS, MICHIGAN.

ELASTIC-FLUID TURBINE.

No. 848,588.  Specification of Letters Patent.  Patented March 26, 1907.

Application filed November 29, 1905. Renewed September 8, 1906. Serial No. 333,778.

*To all whom it may concern:*

Be it known that I, CHARLES W. DAKE, a citizen of the United States, residing at the city of Grand Rapids, county of Kent, State of Michigan, have invented certain new and useful Improvements in Elastic-Fluid Turbines, of which the following is a specification.

This invention relates to improvements in elastic-fluid turbines.

The objects of this invention are, first, to provide an improved and simplified construction of such turbines in large sizes; second, to provide an improved means of compounding in a large-sized elastic-fluid turbine-engine; third, to provide an improved arrangement for preventing the warping of the turbine-wheels of large-sized turbines of the horizontal type; fourth, to provide an improved construction of casing whereby the various parts of the main casing are made accessible, and, fifth, to provide an improved construction of turbine base or foundation, whereby the bearing parts are made conveniently accessible to the engineer.

Further objects and objects relating to the details of construction will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawings, forming a part of this specification, in which—

Figure 5:
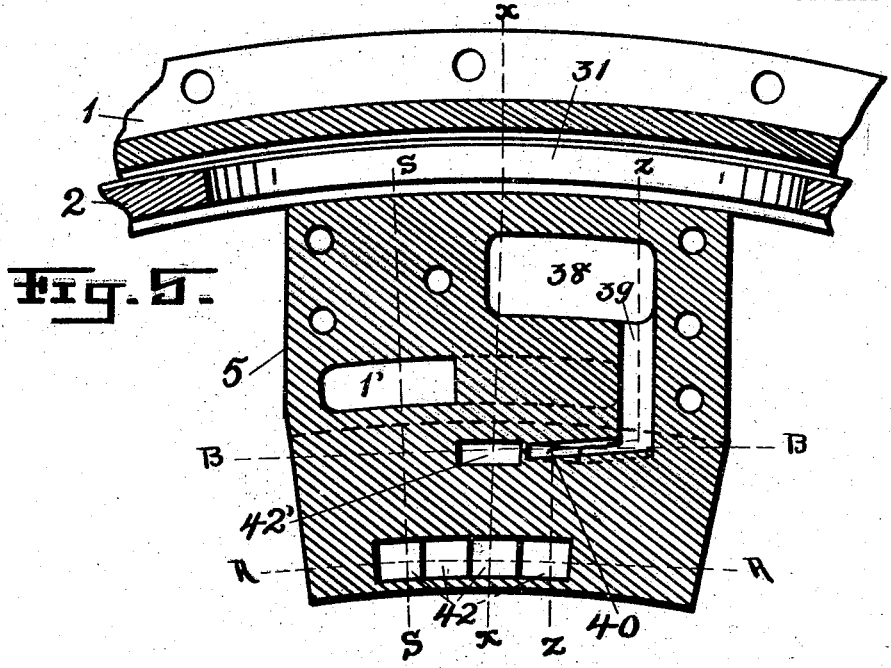
Figure 6:
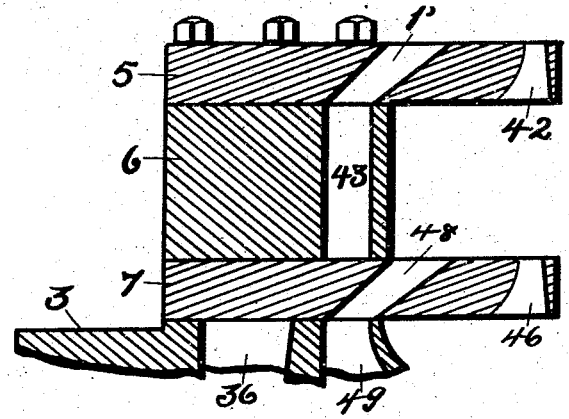

Figure 1 is an elevation view of my improved turbine, portions thereof being shown in vertical central section. Fig. 2 is an elevation view from the right of Fig. 1, showing the removable ring-casing raised to expose the skeleton frame, showing how the internal parts of the turbine are made accessible. Fig. 3 is an enlarged detail sectional view through one of the nozzle and guide-passage blocks and adjacent parts, taken on a line *x x* of Fig. 5, showing the wheels in position, the several guide-passages registering with the buckets for passing the fluid from one row of buckets to another, the nozzle and exit-passages being indicated in dotted lines. Fig. 4 is an enlarged sectional view of the nozzle and guide-passage blocks, taken on irregular line *z z* of Fig. 5, portion of the casing also being illustrated. Fig. 5 is an enlarged detail sectional view of the nozzle and guide-passage block 5, taken on section-line *y y* of Fig. 3 looking down. Fig. 6 is an enlarged detail sectional view of the nozzle and guide-passage blocks and adjacent parts, taken on line *s s* of Fig. 5. Fig. 7 is a detail view of the lower side of the wheel 8, showing the arrangement of the plate 53 for supporting the wheel-disk 8 against sagging at its rim or assuming a saucer shape and also showing the segmental formation of the buckets. Fig. 8 is an enlarged sectional view of the nozzle and guide-passage block 5, taken on line A A of Fig. 5, showing the guide-passage 42; and Fig. 9 is an enlarged view of the nozzle and guide-passage block 5, taken on line B B of Fig. 5, showing the passage 39 connected to the nozzle 40, the guide-passage 42, and the exit-passage 1'.

In the drawings similar numerals of reference refer to similar parts throughout the several views.

Referring to the numbered parts of the drawings, the casing, consisting of the removable part 1, which embraces and protects the skeleton frame 2, is supported on a suitable base 3. The top 4 of the casing rests upon the skeleton frame 2 and will in ordinary use of this turbine be used to support an electrical generator. Within the skeleton frame 2 is the nozzle or guide-passage block 5, resting on its support 6, to the under side of which nozzle-block support is secured the second nozzle and guide-passage block 7. The disk-wheels 8 and 9 are carried by the central vertical shaft 11. A diaphragm or head 10 incloses the under side of the wheel-casing and rests upon a flange 56 of the base 3.

The vertical shaft 11 supports the turbine-wheels 8 and 9. This shaft is provided with a suitable step-bearing 12, which carries a tapered bearing-bushing 13, supported by the bearing-bushing casing 14. A threaded nut or collar 15 is screw-threaded onto the upper end of the tapered bearing-bushing 13. This bushing is split, so that when the nut is turned on it it is adjustable to the shaft to compensate for wear and to bring it into proper contact with the shaft 11 to secure the best results.

The step-bearing 12 is supported on a boss 27 on the shelf 57, the edge of which shows at 58. This shelf is supported and strengthened by the radial ribs 70, 71, 72, and 73.

A bearing-bushing 18 is arranged around the upper end of the shaft. This is carried in the bearing-bushing 17, which is carried on the top plate or head of the skeleton frame 2. An oil-receptacle 16 is formed in its upper end. A flange 19 is secured blow the bushing 18, extending outwardly therefrom. A flange 20 is secured to the support 17, extending inwardly into proximity to the shaft 11 and forming a receptacle to catch the drip from the bearing.

A stuffing-box consisting of parts 21 and 22 surrounds the shaft 11 and forms a joint between it and the top plate or top head of the casing. A second stuffing-box, consisting of the parts 25 and 26, forms a joint between the bottom plate and the diaphragm or head 10 and the shaft.

A spacing-collar 24 is between the hubs of the turbine-wheels 8 and 9, and these are clamped together by a jam-nut 23, which locks the wheels securely together on the shaft.

The outer removable casing 1 is provided with a flange 29, which rests upon the skeleton frame 2 and is secured thereto by bolts or cap-screws 66. Eyebolts 28 afford means for lifting or elevating the removable casing 1. A flange 30 is at the bottom of this casing, fitting onto a suitable projection at the bottom of the skeleton frame 2 and forming a steam-tight joint at both of these points.

The skeleton frame has openings 31 through its periphery, through which the operative parts of the turbine are made accessible, each of these openings preferably embracing one of the nozzle and guide-passage blocks and their supports.

The elastic fluid enters the engine through a passage 33, a flange 34 being around the same. An annular passage 35 extends entirely around the engine and conveys the fluid to the various nozzle-sections. The passages to the nozzle-sections are controlled and governed by a regulating-valve 62. Regulating means for this valve is in the valve-chest 60, the elastic fluid being supplied thereto through the pipes 61.

63 is a passage from the passage 35 to the expansion-chamber 36 of each nozzle-section, the regulating-valve 62 controlling this passage 63 by suitable regulating means, the operation of which I have referred to in a general way.

The base 3 is finished at the top, and on this is placed the nozzle and guide-passage block 7, the expansion-chamber of each nozzle-section connecting to a passage 37. A spacing-block 6 rests upon the block 7 and supports upon its upper surface the upper nozzle and guide-passage block 5. The passages through these blocks 5, 6, and 7, briefly indicated, are from the expansion-chamber 36, through the passage 37 in the block 7, through the passage 38 in the block 6, through the passage 39 in the block 5, to the nozzle-passage 40, thence to the buckets 41, thence through the guide-passage 42 to the buckets 41', and thence through the guiding-passage 42 to the opposite buckets 41, thence to the guide-passage 42, repeating as often as desired, advancing at each circuit and eventually passing through the exit-passage 1', thence through the passage 43 in the block 6 to the nozzle 44 of the lower block 7, thence to the buckets 45, thence through the passage 46 to the buckets 47, thence through the passage 46 and buckets 47 as often as desired, thence out through the exit-passage 49 leading to the exhaust-chamber 50, which connects by passages 51 and 52 into the exhaust-pipe 32.

The buckets are segmental, as appears in Fig. 7, the segments of the buckets being indicated by the numeral 41, and are of the same form and construction as appear in my application for patent concurrent herewith, where they are specifically claimed, they being cut into the inner sides of the segments which are on the opposite sides of the wheel-disks in diverging angles, so that the circulation of the steam or elastic fluid therethrough propels the wheel in the same direction wherever the steam is delivered to it, the particular form of the buckets 41, 41', 45, and 47 not being material to the invention set forth in this application, this invention having to do more particularly, among other things, with the arrangement of the passages for delivering the elastic fluid thereto, so far as the nozzles, passages, and buckets are concerned. The bucket-sections are retained on the web of the turbine-wheels by means described and claimed also in an application concurrent herewith.

On the diaphragm or head 10 is a flange 55, extending up into proximity to the under side of the wheel-disk 9 out toward the buckets and forming an annular receptacle 67 for receiving the slight amount of condensation that occurs at that point, drainage-apertures being in the chambers to draw off the liquid. An annular flange 68 is on the upper top plate and fits just within the segmental buckets at that point, serving to retain the steam in the outer part of the wheel and prevent its working inwardly toward the bearings, and consequently preventing the unnecessary heating of the bearings. The steam, however, enters around the various parts and serves to keep them evenly heated, and thus prevents any tendency to distortion.

On the under side of the turbine-wheel disks 8 and 9 are formed shoulders 69, against which the edge of sheet-metal plates 53 and 54 rest, such plates being dish-shaped and concave on their upper sides, their peripheries resting against the supporting collars or flanges on the shaft 11, thereby insuring an even upward pressure to prevent the distortion of the wheel-disks of the turbine-wheels.

Having thus described my invention, what I claim as new, and desire to secure by Letters Patent, is—

1. In an elastic-fluid turbine, the combination of the casing and support, consisting of base-section 3 containing exhaust-chamber and passages, the skeleton frame 2 resting thereon, and the detachable ring-casing 1 embracing the skeleton casing, adapted to be detached and elevated therefrom; and a separate casing or frame 4 resting on the skeleton frame.

2. In a turbine-engine, the combination of the casing consisting of a base part, a skeleton-frame part, and an outer detachable ring portion adapted to be separate therefrom; a central vertical shaft supported on a step-bearing; a pair of turbine-wheels secured to said shaft; supporting dish-shaped plates under the said wheels and engaging a suitable annular shoulder thereon to prevent contortion therein; suitable buckets on the peripheries of said wheels; and nozzles for delivering the elastic fluid thereto, coacting for the purpose specified.

3. In an elastic-fluid turbine, the combination of a base-section; a vertical shaft suitably arranged in the center thereof with a pair of turbine-wheels with buckets on their peripheries; a series of nozzle and guide-passage blocks supported within the buckets of said turbine-wheels; and separator-blocks between the said nozzle and guide-passage blocks for supporting them in proper position and provided with proper passages for suitably connecting the same together, coacting for the purpose specified.

4. In an elastic-fluid turbine, the combination of the casing and support consisting of base-section 3 containing the exhaust chamber and passage, the skeleton frame 2 resting thereon, and the detachable ring-casing 1, embracing the skeleton casing, adapted to be detached and elevated therefrom.

5. In an elastic-fluid turbine-engine, the combination of a suitable base; a vertical shaft arranged centrally therein and supported in a suitable step-bearing, the base 3 supporting said bearing and being provided with an annular inlet-chamber 35, with suitable inlet-passages 63 therefrom to the different nozzle-sections; governing-valves 60 and 61 for controlling the said nozzles in the exhaust-chamber in said base; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-passage blocks 5 and 7 extending inwardly between the oppositely-faced bucket-segments on each wheel with a spacer-block 6 between the same, containing passages 36, 37, 38, 39 and 40, delivering into the buckets 47 of the lower bucket-segments of the upper wheel 8, and a passage 42 in the guide-block 5 leading from the inner side of said bucket 41 to the inner side of the said bucket 41', and thence through the said guide-block 5 to the guide-passage 42' from the outer side of the buckets 41' to the outer side of bucket 41; an exit-passage 1' in said guide-block 5 in advance of the inlet-passages 39 connecting to a passage 43 through the spacer-block 6; a nozzle-passage 44 delivering thence through guide-block 7 to the outer side of the buckets 45; a passage 46 through the said guide-block 7 to the inner side of the upper bucket 47; a passage 48 to connect the outer periphery of the said upper buckets 47 to the exhaust-chamber 50; an upper skeleton casing 2 extending to form the upper head of the turbine-chamber, with a stuffing-box at its center to embrace the vertical shaft and an annular flange 68 in proximity to the upper side of the wheel 8 just within the bucket-segments and also provided with openings 31 to permit access to the guide-blocks, separator-block and turbine-buckets; a ring-casing 1 flanged at its upper and lower side to fit onto the casing 2, with means for elevating the same to make the said skeleton casing 2 accessible; a casing 4 resting on top of said casing 2 to form a base for supporting a dynamo or other machinery above; and suitable adjustable bearings at the center of said shaft, all coacting substantially as described and for the purpose specified.

6. In an elastic-fluid turbine-engine, the combination of a suitable base; a vertical shaft arranged centrally therein and supported in a suitable step-bearing, the base 3 supporting said bearing and being provided with an annular inlet-chamber 35, with suitable inlet-passages 63 therefrom to the different nozzle-sections; governing-valves 60 and 61 for controlling the said nozzles, in the exhaust-chamber in said base; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-passage blocks 5 and 7 with portions projecting from said oppositely-faced buckets, and a spacer-block 6 between said guide-passage blocks, the passages therethrough to deliver elastic fluid to operate the said turbine-wheels and pass through the same successively, thence to the exhaust; an upper skeleton casing 2 extending to form the upper head of the turbine-chamber, with a stuffing-box at its center to embrace the vertical shaft and an annular flange 68 in proximity to the upper side of the wheel 8 just within the bucket-segments and also provided with openings 31 to permit access to the guide-blocks, separator-block and turbine-buckets; a ring-casing 1 flanged at its upper and lower side to fit onto the casing 2, with means for elevating the same, to make the said skeleton casing 2 accessible; a casing 4 resting on top of said casing 2 to form a base for supporting a dynamo or other machinery above; and adjustable bearings at the center of said shaft, all coacting substantially as described and for the purpose specified.

7. In an elastic-fluid turbine-engine, the combination of a suitable base; a vertical shaft arranged centrally therein and supported in a suitable step-bearing, the base 3 supporting said bearing and being provided with an annular inlet-chamber 35, with suitable inlet-passages 63 therefrom to the different nozzle-sections; governing-valves 60 and 61 for controlling the said nozzles in the exhaust-chamber in said base; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-blocks arranged to deliver steam successively to the said oppositely-faced buckets; an upper skeleton casing 2 extending to form the upper head of the turbine-chamber, with a stuffing-box at its center to embrace the vertical shaft and an annular flange 68 in proximity to the upper side of the wheel 8 just within the bucket-segments and also provided with openings 31 to permit access to the guide-blocks, separator-block and turbine-buckets; a ring-casing 1 flanged at its upper and lower side to fit onto the casing 2, with means for elevating the same to make the said skeleton casing 2 accessible; a casing 4 resting on top of said casing 2 to form a base for supporting a dynamo or other machinery above; and suitable adjustable bearings at the center of said shaft, all coacting substantially as described and for the purpose specified.

8. In an elastic-fluid turbine-engine, the combination of a suitable base; a vertical shaft arranged centrally therein and supported in a suitable step-bearing, the base 3 supporting said bearing and being provided with an inlet-chamber 35, with a suitable inlet-passage 63 therefrom to the nozzle; a governing-valve for controlling the said nozzle in the exhaust-chamber in said base; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-passage blocks 5 and 7 extending inwardly between the oppositely-faced bucket-segments on each wheel with a spacer-block 6 between the same, containing passages 36, 37, 38, 39 and 40, delivering into the buckets 41 of the lower bucket-segments of the upper wheel 8, and a passage 42 in the guide-block 5 leading from the inner side of the said bucket 41 to the inner side of the said bucket 41' and thence through the said guide-block 5 to a guide-passage 42' from the outer side of bucket 41' to the outer side of bucket 41, and an exit-passage 1' in said guide-block 5 in advance of the inlet-passages 39 connecting to a passage 43 through the spacer-block 6, and a nozzle-passage 44 delivering thence through guide-block 7 to the outer side of the buckets 45, and a passage 46 through the said guide-block 7 to the inner side of the upper bucket 47, and a passage 48 to connect the outer periphery of the said upper buckets 47 to the exhaust-chamber 50; an upper skeleton casing 2 extending to form the upper head of the turbine-chamber, with a stuffing-box at its center to embrace the vertical shaft and an annular flange 68 in proximity to the upper side of the wheel just within the bucket-segments and also provided with openings 31 to permit access to the guide-blocks, separator-block and turbine-buckets; a ring-casing 1 flanged at its upper and lower side to fit onto the casing 2, with means for elevating the same to make the said skeleton casing 2 accessible; a casing 4 resting on top of said casing 2 to form a base for supporting a dynamo or other machinery above; and suitable adjustable bearings at the center of said shaft, all coacting for the purpose specified.

9. In an elastic-fluid turbine-engine, the combination of a suitable base; a vertical shaft arranged centrally therein and supported in a suitable step-bearing, the base 3 supporting said bearing and being provided with an inlet-chamber 35, with a suitable inlet-passage 63 therefrom to the nozzle; a governing-valve for controlling the said nozzle in the exhaust-chamber in said base; a lower head 10 for the turbine-wheel casing, supported on a flange 56 thereof and provided with a suitable stuffing-box at the center to embrace the said vertical shaft, and provided with an annular flange 56 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-passage blocks 5 and 7 with portions projecting from said oppositely-faced buckets, and a spacer-block 6 between said guide-passage blocks, the passages therethrough to deliver elastic fluid to operate the said turbine-wheels and pass through the same successively, thence to the exhaust; an upper skeleton casing 2 extending to form the upper head of the turbine-chamber, with a stuffing-box at its center to embrace the vertical shaft and an annular flange 68 in proximity to the upper side of the wheel 8 just within the bucket-segments and also provided with openings 31 to permit access to the blocks, separator-blocks, and turbine-buckets; a ring-casing 1 flanged at its upper and lower side to fit onto the casing 2, with means for elevating the same to make said skeleton casing 2 accessible; a casing 4 resting on top of said casing 2 to form a base for supporting a dynamo or other machinery above; and suitable adjustable bearings at the center of said shaft, all coacting substantially as described and for the purpose specified.

10. In an elastic-fluid turbine-engine, the combination of a suitable base; a vertical shaft arranged centrally therein and supported in a suitable step-bearing, the base 3 supporting said bearing and being provided with an inlet-chamber 35, with a suitable inlet-passage 63 therefrom to the nozzle; a governing-valve for controlling the said nozzle in the exhaust-chamber in said casing; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-blocks arranged to deliver steam successively to the said oppositely-faced buckets; an upper skeleton casing 2 extending to form the upper head of the turbine-chamber, with a stuffing-box at its center to embrace the vertical shaft and an annular flange 68 in proximity to the upper side of the wheel 8 just within the bucket-segments and also provided with openings 31 to permit access to the guide-blocks, separator-blocks and turbine-buckets; a ring-casing 1 flanged at its upper and lower side to fit onto the casing 2, with means for elevating the same to make the said skeleton casing 2 accessible; a casing 4 resting on top of said casing 2 to form a base for supporting a dynamo or other machinery above; and suitable adjustable bearings at the center of said shaft, all coacting substantially as described and for the purpose specified.

11. In an elastic-fluid turbine-engine, the combination of a suitable base; a vertical shaft arranged centrally therein and supported in a suitable step-bearing, the base 3 supporting said bearing and being provided with an annular inlet-chamber 35, with suitable inlet-passages 63 therefrom to the different nozzle-sections; governing-valves 60 and 61 for controlling the said nozzles in the exhaust-chamber in said base; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-passage blocks 5 and 7 extending inwardly between the oppositely-faced bucket-segments on each wheel with a spacer-block 6 between the same, containing passages 36, 37, 38, 39 and 40, delivering into the buckets 41 of the lower bucket-segments of the upper wheel 8 and a passage 42 in the guide-block 5 leading from the inner side of the said bucket 41 to the inner side of the said bucket 41', and thence through the said guide-block 5 to a guide-passage 42' from the outer side of the buckets 41' to the outer side of bucket 41, and an exit-passage 1' in said guide-block 5 in advance of the inlet-passages 39 connecting to a passage 43 through the spacer-block 6, and a nozzle 44 delivering thence through guide-block 7 to the outer side of the buckets 45, and a passage 46 through the said guide-block 7 to the inner side of the upper bucket 47, and a passage 48 to connect the outer periphery of the said upper buckets 47 to the exhaust-chamber 50, and suitable adjustable bearings at the center of said shaft, all coacting substantially as described and for the purpose specified.

12. In an elastic-fluid turbine-engine, the combination of a suitable base; a vertical shaft arranged centrally therein and supported in a suitable step-bearing, the base 3 supporting said bearing and being provided with an annular inlet-chamber 35, with suitable inlet-passages 63 therefrom to the different nozzle-sections; governing-valves 60 and 61 for controlling the said nozzles in the exhaust-chamber in said base; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-passage blocks 5 and 7 with portions projecting from said oppositely-faced buckets, and a spacer-block 6 between said guide-passage blocks, the passages therethrough to deliver elastic fluid to operate the said turbine-wheels and pass through the same successively, thence to the exhaust; and suitable adjustable bearings at the center of said shaft, all coacting substantially as described and for the purpose specified.

13. In an elastic-fluid turbine-engine, the combination of a suitable base; a vertical shaft arranged centrally therein and supported in a suitable step-bearing, the base 3 supporting said bearing and being provided with an annular outlet-chamber 35, with suitable inlet-passages 63 therefrom to the different nozzle-sections; governing-valves 60 and 61 for controlling the said nozzles in the exhaust-chamber in said base; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-blocks arranged to deliver steam successively to the said oppositely-faced buckets; and suitable adjustable bearings at the center of said shaft, all coacting substantially as described and for the purpose specified.

14. In an elastic-fluid turbine-engine, the combination of a suitable base; a vertical shaft arranged centrally therein and supported in a suitable step-bearing, the base 3 supporting said bearing and being provided with an inlet-chamber 35, with a suitable inlet-passage 63 therefrom to the nozzle; a governing-valve for controlling the said nozzle in the exhaust-chamber in said base; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-passage blocks 5 and 7 extending inwardly between the oppositely-faced bucket-segments on each wheel with a spacer-block 6 between the same, containing passages 36, 37, 38, 39 and 40, delivering into the buckets 41 of the lower bucket-segments of the upper wheel 8 and a passage 42 in the guide-block 5 leading from the inner side of the said bucket 41 to the inner side of the said bucket 41', and thence through the said guide-block 5 to a guide-passage 42' from the outer side of buckets 41' to the outer side of the bucket 41, and an exit-passage 1' in said guide-block 5 in advance of the inlet-passages 39 connecting to a passage 43 through the spacer-block 6, and a nozzle-passage 44 delivering thence to the guide-block 7 to the outer side of the buckets 45, and a passage 46 through the said guide-block 7 to the inner side of the upper buckets 47 and a passage 48 to connect the outer periphery of the said upper buckets 47 to the exhaust-chamber 50; and suitable adjustable bearings at the center of said shaft, all coacting substantially as described and for the purpose specified.

15. In an elastic-fluid turbine-engine, the combination of a suitable base; a vertical shaft arranged centrally therein and supported in a suitable step-bearing, the base 3 supporting said bearing and being provided with an inlet-chamber 35, with a suitable inlet-passage 63 therefrom to the nozzle; a governing-valve for controlling the said nozzle in the exhaust-chamber in said base; a lower head 10 for the turbine-wheel casing, supported on a flange 56 thereof and provided with a suitable stuffing-box at the center to embrace the said vertical shaft, and provided with an annular flange 55 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-passage blocks 6 and 7 with portions projecting from said oppositely-faced buckets, and a spacer-block 6 between said guide-passage blocks, the passages therethrough to deliver elastic fluid to operate the said turbine-wheels and pass through the same successively, thence to the exhaust; and suitable adjustable bearings at the center of said shaft, all coacting substantially as described and for the purpose specified.

16. In an elastic-fluid turbine-engine, the combination of a suitable base; a vertical shaft arranged centrally therein and supported in a suitable step-bearing, the base 3 supporting said bearing and being provided with an inlet-chamber 35, with a suitable inlet-passage 63 therefrom to the nozzle; a governing-valve for controlling the said nozzle in the exhaust-chamber in said base; a lower head 10 for the turbine-wheel casing supported on a flange 56 thereof and provided with a suitable stuffing-box at the center to embrace the said vertical shaft, and provided with an annular flange 56 extending up into proximity with the lower surface of the lower turbine-wheel adjacent to the bucket-sections; turbine-wheels 8 and 9 secured to the said vertical shaft by suitable hubs and arranged one above the other; oppositely-faced bucket-segments suitably secured to the webs of said turbine-wheels; guide-blocks arranged to deliver steam successively to the said oppositely-faced buckets; and suitable adjustable bearings at the center of said shaft, all coacting substantially as described and for the purpose specified.

17. In an elastic-fluid turbine, the combination of a base with an annular supply-passage around the same, with suitable controlling-valves and an exhaust-passage leading therefrom; a head for the said base, with a flange extending into proximity to the bucket-segments of the bottom turbine-wheel; a step-bearing supported on a suitable shelf at the center with openings through the side of the base to make the same accessible; blocks containing nozzle and guide passages, supported by said base; and a vertical shaft with turbine-wheels carried by the said base, coacting for the purpose specified.

18. In an elastic-fluid turbine, the combination of a base with an annular supply-passage around the same, with suitable controlling-valves and an exhaust-passage leading therefrom; a step-bearing supported on a suitable shelf at the center, with openings through the side of the base to make the same accessible; blocks containing nozzle and guide passages, supported by said base; and a vertical shaft with turbine-wheels carried by said base, coacting for the purpose specified.

19. In an elastic-fluid turbine, the combination of a base with an annular supply-passage around the same, with suitable controlling-valves and an exhaust-passage leading therefrom; a step-bearing supported on a suitable shelf at the center with openings through the side of the base to make the same accessible; blocks containing guide-passages, supported by said base; and a vertical shaft with turbine-wheels carried by the said base, coacting for the purpose specified.

20. In an elastic-fluid turbine-engine, the combination of a suitable base, supporting-blocks with guide-passages therein and inlet-passages; a vertical shaft with a number of horizontal turbine-wheels thereon carrying oppositely-faced bucket-sections secured to the periphery of the webs of said wheels; nozzle and guide passage blocks projecting between the buckets on said wheels; a spacer-block between the same, containing appropriate passages leading first to the upper set of turbine-buckets and thence delivering downwardly; a suitable casing surrounding the said guide-passage blocks and turbine-wheels and closing the upper side of the same, with a suitable stuffing-box surrounding the shaft at the center, coacting for the purpose specified.

21. In an elastic-fluid turbine-engine, the combination with a vertical shaft of horizontally-disposed turbine-wheels with disk-like centers, having annular shoulders on their under sides; dish-shaped supports arranged to fit against said shoulders and embrace the shaft to serve as a truss or brace for the said turbine-wheel, as specified.

22. In a turbine-engine, the combination with a suitable casing, of a vertical shaft; a horizontally-arranged turbine-wheel therein, with nozzle and guide passage blocks extending to the same; and an annular flange extending into proximity with the said turbine-wheel on its under side toward its periphery, for the purpose specified.

23. In an elastic-fluid turbine, the combination of a suitable base having inlet-passages therein; nozzle and guide-passage blocks with a separator-block supported on said base with passages therethrough; and turbine-wheels with buckets at their peripheries facing each other from opposite sides thereof and embracing the said nozzle and guide passage blocks, as specified.

24. In an elastic-fluid turbine-engine, the combination of a series of wheels with oppositely-faced buckets secured to the peripheries; blocks with nozzle and guide passages extending into and between the said buckets of each wheel; and intermediate separator-blocks, with passages connecting from one set of buckets to the inlet of the next set of buckets, whereby the engine is compounded and the expansion of the expansive fluid is utilized.

In witness whereof I have hereunto set my hand and seal in the presence of two witnesses.

CHARLES W. DAKE. [L. S.]

Witnesses:
ADELAIDE J. ADAMS,
OTIS A. EARL.